US006719372B2

(12) United States Patent
Glaspie et al.

(10) Patent No.: US 6,719,372 B2
(45) Date of Patent: Apr. 13, 2004

(54) CONE RECLINER/CLUTCH MECHANISM

(76) Inventors: Robert E. Glaspie, 1328 E. Hiddenview Dr., Phoenix, AZ (US) 85048; Paul A. Elio, 6732 6$^{th}$ St., Scottsdale, AZ (US) 85251; Hari Sankara Iyer, 6013 N. 81$^{st}$ St., Scottsdale, AZ (US) 85250

( * ) Notice: Subject to any disclaimer, the term of this patent is extended or adjusted under 35 U.S.C. 154(b) by 0 days.

(21) Appl. No.: 10/217,864

(22) Filed: Aug. 13, 2002

(65) Prior Publication Data

US 2003/0052522 A1 Mar. 20, 2003

Related U.S. Application Data

(63) Continuation-in-part of application No. 09/971,891, filed on Oct. 5, 2001, now Pat. No. 6,527,342.
(60) Provisional application No. 60/238,584, filed on Oct. 6, 2000.

(51) Int. Cl.$^7$ .................................................. B60N 2/22
(52) U.S. Cl. ......................... 297/373; 297/374; 74/527
(58) Field of Search ............................ 297/354.12, 364, 297/365, 373, 374; 403/359.1, 359.2, 359.3; 74/527, 551.1, 551.3; 192/66.2, 66.22, 66.23

(56) References Cited

U.S. PATENT DOCUMENTS 2,852,115 A * 9/1958 O'Neill ................... 192/66.23
4,043,206 A * 8/1977 Narihiro et al. ......... 192/66.22
5,685,610 A * 11/1997 Minai ......................... 297/367

FOREIGN PATENT DOCUMENTS

| DE | 916263 | * | 8/1954 | ................. 297/374 |
| DE | 1914528 | * | 6/1970 | ................. 297/374 |
| DE | 200 00 950 U1 | * | 6/2001 | |
| JP | 51624 | * | 4/1977 | ................. 297/373 |

* cited by examiner

Primary Examiner—Peter R. Brown
(74) Attorney, Agent, or Firm—Parsons & Goltry; Robert A. Parsons; Michael W. Goltry

(57) ABSTRACT

A seat frame recliner mechanism includes a cylindrical element defining an inner surface with gear teeth, a journal contact area, and a notch formed in a radially extending surface. The cylindrical element, including the gear teeth, the journal contact area, and the notch are formed as an integral unit to prevent false latching. A conically shaped element has an outer surface with mating gear teeth and a mating journal contact area. A tab is positioned to be received within the notch for limiting and defining reclining movements. The conically shaped element is movable axially inward into a locked orientation with the gear teeth of the elements engaging for inhibiting relative movement of a back portion and a seat portion, and movable axially outward to an unlocked orientation with the gear teeth of the elements disengaged for permitting relative movement of the back and seat portions. The journal contact areas of the inner and outer surfaces cooperate to maintain axial alignment between the elements during relative axial movement therebetween.

22 Claims, 16 Drawing Sheets

CONE RECLINER/CLUTCH MECHANISM

CROSS-REFERENCE TO RELATED APPLICATION

This application is a continuation-in-part of U.S. patent application Ser. No. 09/971,891, filed Oct. 5, 2001, now U.S. Pat. No. 6,527,342, which claimed the benefit of U.S. Provisional Patent Application Serial No. 60/238,584, filed Oct. 6, 2000.

BACKGROUND OF THE INVENTION

1. Field of the Invention

This invention relates to seating devices.

More particularly, the present invention relates to adjustment mechanisms for seating devices.

In a further and more specific aspect, the present invention concerns adjustment mechanisms for vehicle seating.

2. The Prior Art

Within the art of recliner mechanisms for vehicle seating, many and diverse devices have been developed. These devices often function satisfactorily for the actual reclining function, but function poorly in the area of safety. Typically, when a force of a specific magnitude, such as from a collision, is applied to a seat back, the seat has a catastrophic failure. In other words, the seat back remains more or less rigid and supportive until a certain level of force is exceeded. When this level is reached, the recliner mechanism breaks, letting the seat back pivot unrestrained. When this failure occurs, injury to the occupant of the seat can result. In many automobiles, the space allocated for a recliner mechanism is very limited. By reducing size and cost, current recliner mechanisms are often less than robust and fail at the application of relatively low forces. With the increase of restraint belts, which attach to the seat back, forces applied to the seat back in a collision will only increase.

It would be highly advantageous, therefore, to remedy the foregoing and other deficiencies inherent in the prior art.

Accordingly, it is an object the present invention to provide a recliner mechanism which is extremely rugged and which fixedly holds the seat back relative to the seat portion.

It is another object the present invention to provide an embodiment of the recliner mechanism which clutches under a specified load.

SUMMARY OF THE INVENTION

Briefly, to achieve the desired objects of the present invention in accordance with a preferred embodiment thereof, provided is a recliner mechanism for a seat frame including a back portion and a seat portion. The recliner mechanism includes an internal conically shaped element attached to either the back portion or the seat portion and a mating external cylindrical element attached to the other of the back portion and the seat portion. A first portion of the inner surface of the cylindrical element is conically tapered with circumferentially extending gear teeth thereon and a second portion is designed to form a first journal contact area. The outer surface of the conically shaped element has circumferentially extending mating gear teeth on a first portion and a second portion is designed to form a first mating journal contact area. The second portion of the inner surface of the cylindrical element and the second portion of the outer surface of the conically shaped element cooperate to form a first mating journal for maintaining axial alignment between the conically shaped element and the cylindrical element during relative axial movement therebetween. In one embodiment, the first mating journal contact areas are positioned at one end of the gear teeth and second mating journal contact areas are positioned at the opposed end of the gear teeth. The axial length of the first and or second mating journal contact areas is greater than the relative axial movement between the cylindrical element and the conically shaped element so that one or both of the journals maintain axial alignment between the cylindrical element and the conically shaped element during relative axial movements. In this fashion the two sets of gear teeth are always in proper axial alignment for easy and accurate movement between a disengaged position and an engaged position.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
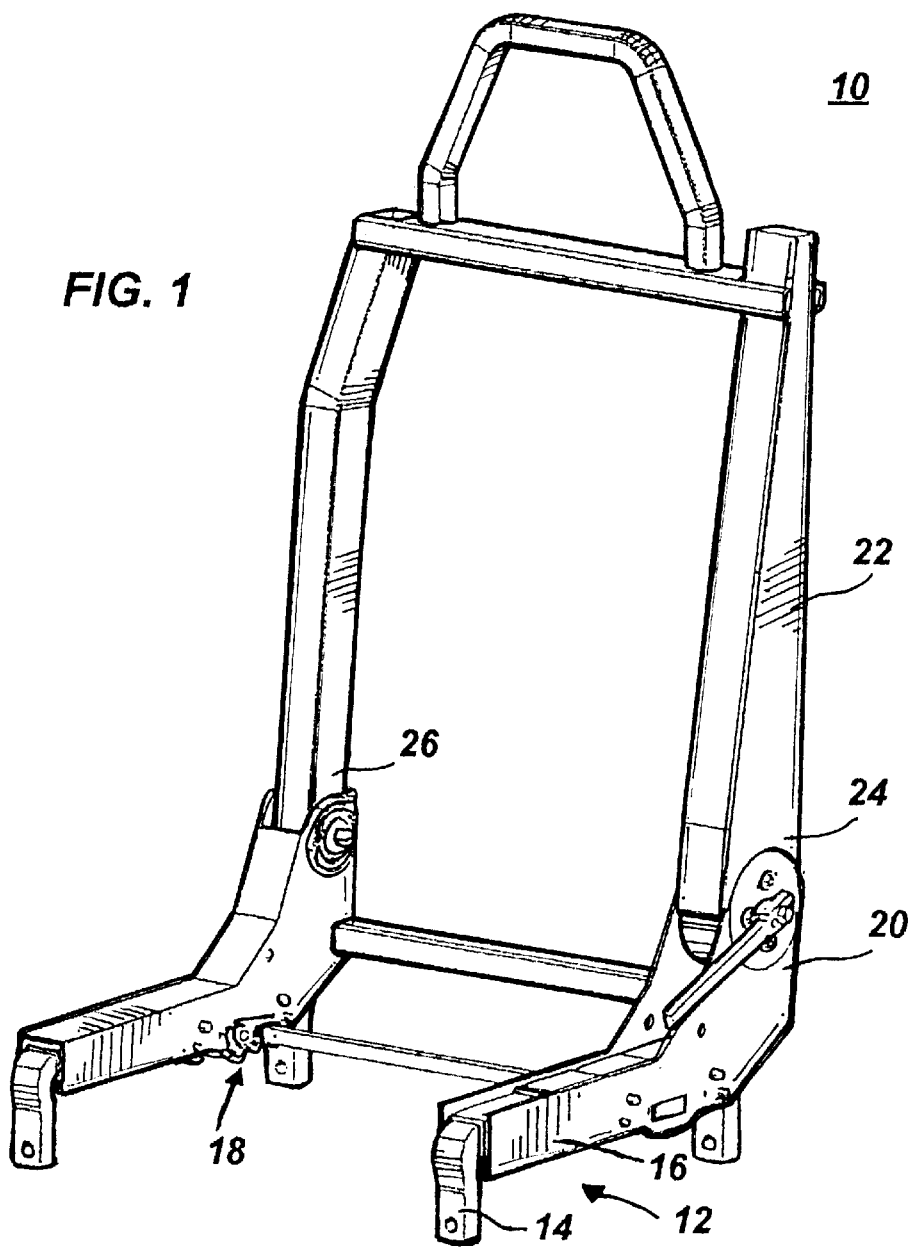
FIG. 1 is a perspective view of a seat frame and recliner mechanism incorporating the present invention.

Turning now to the drawings in which like reference characters indicate corresponding elements throughout the several views, attention is first directed to FIG. 1, which illustrates a seat frame 10 of a seating mechanism for use in vehicles. Seat frame 10 includes a track assembly 12 having an inner track 14 and an outer track 16. Outer track 16 is reciprocally movable upon inner track 14 by employing a latch mechanism 18. Reciprocal movement of outer track 16 permits adjustment of a seat as is commonly employed in commercial and private vehicles. Substantially any latch mechanism can be employed, however in the preferred embodiment, a latch mechanism as disclosed in a patent for ADJUSTABLE SUPPORT APPARATUS AND ARCHITECTURE FOR ADJUSTING SUPPORT APPARATUS, U.S. Pat. No. 6,330,994, issued Dec. 18, 2000, is employed.

Outer track 16 includes a rearward end 20 to which a back frame 22 is pivotally attached. In this embodiment, rearward end 20 is an integral portion of outer track 16. It will be understood that often a back frame is attached to the track via a riser or bracket, which is a separate element. This can also be utilized in the present invention. Back frame 22 includes an out board member 24 and an in board member 26. Out board member 24 is pivotally coupled to end 20 on the out board side of track assembly 12 by means of reclining mechanism 28. Reclining mechanism 28 allows for adjustment in the positioning of back frame 22, as will be described in more detail presently. It will be understood by those skilled in the art that while, in the present embodiment, reclining mechanism 28 is coupled to the out board side of seat frame 10 and a free pivot is located on the in board side of seat frame 10, this is simply convention, and they may be reversed as desired.

Figure 2:
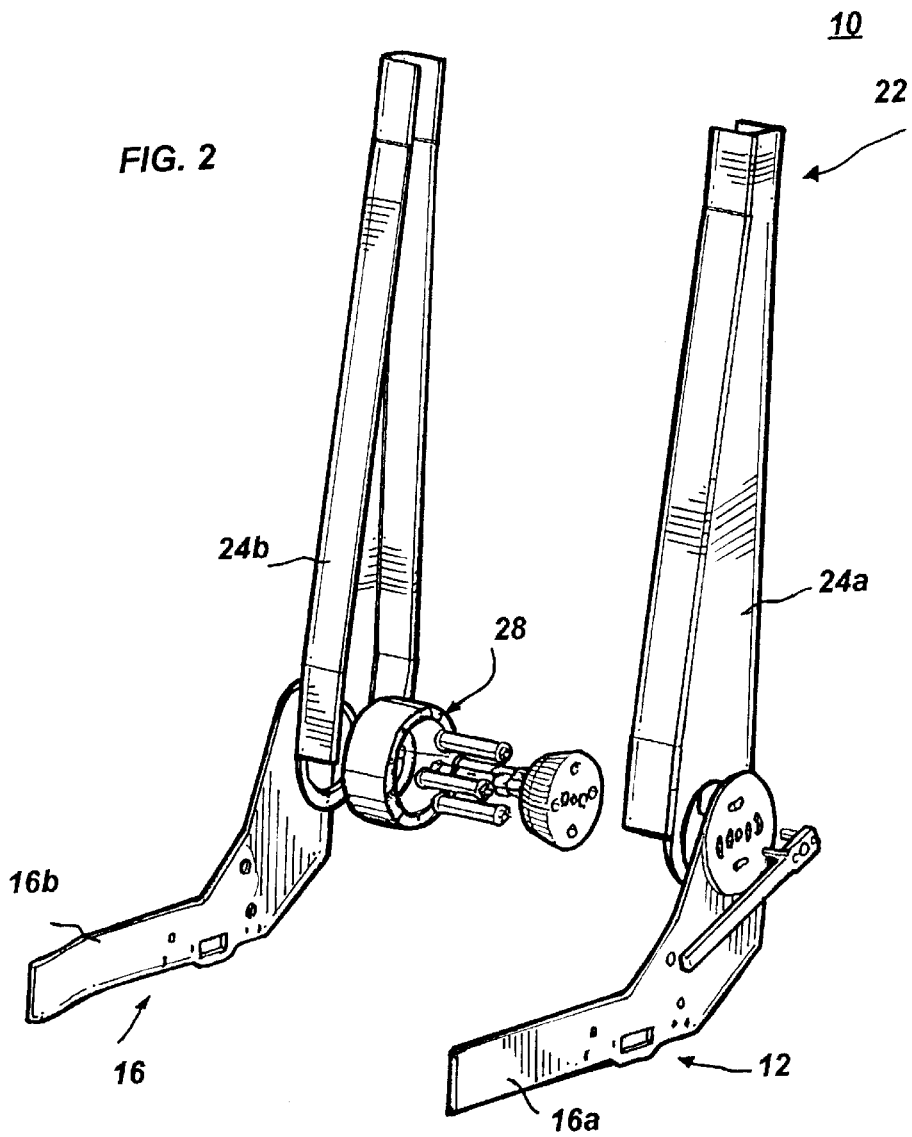
FIG. 2 is an exploded perspective view of a portion of the seat frame and recliner mechanism of FIG. 1.

Turning now to FIG. 2, the out board side of frame 10 and reclining mechanism 28 are shown in an exploded view to better illustrate the various components and their relationships. As can be seen best in FIG. 2, outer track 16 includes an out board member 16a and an in board member 16b, illustrated in an exploded or separated position. Also, outboard member 24 of seatback 22 includes an outer element 24a and a mating inner element 24b, illustrated in an exploded or separated position.

Figure 3:
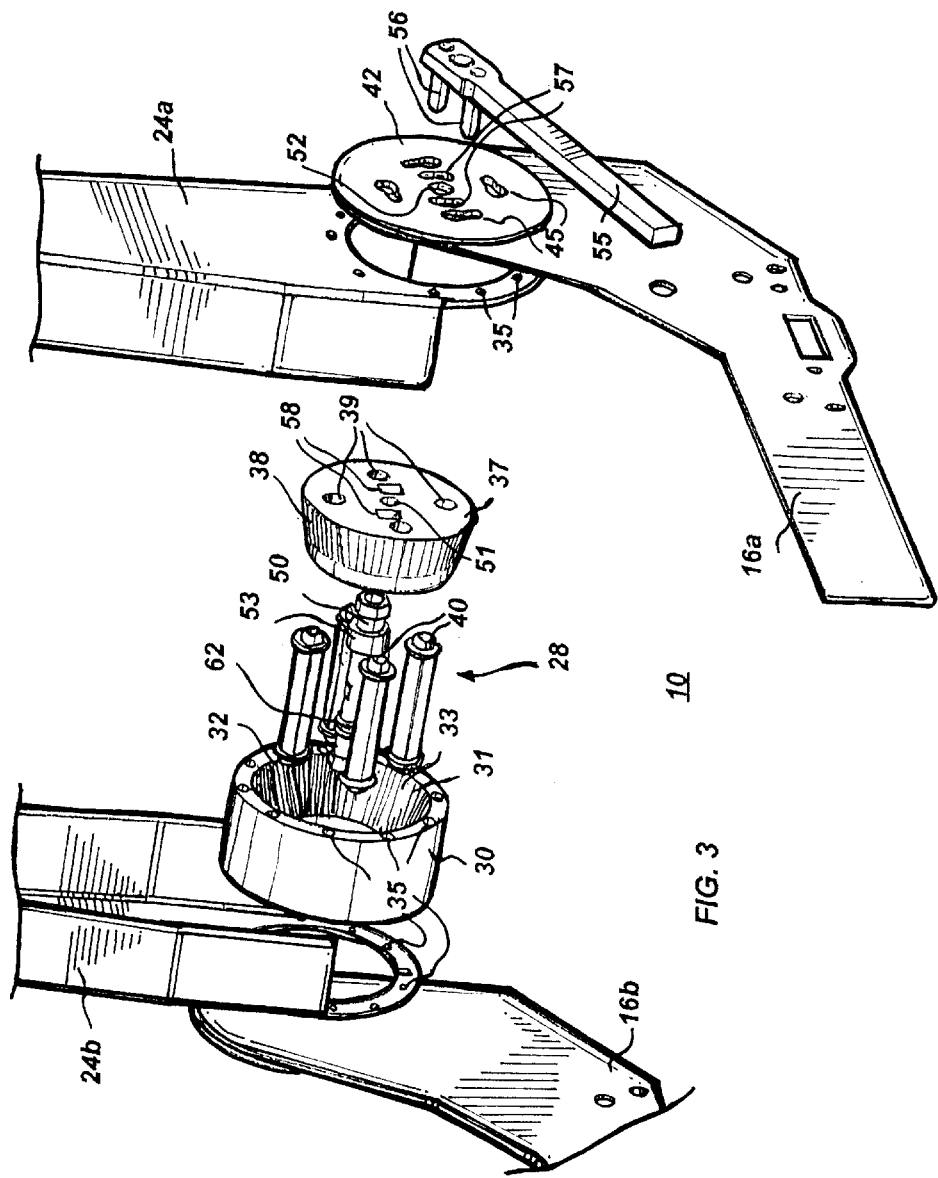
FIG. 3 is an enlarged perspective view, similar to FIG. 2, illustrating the various components of the recliner mechanism in more detail.

Referring additionally to FIG. 3, it can be seen that reclining mechanism 28 includes a cylindrically shaped element 30 having an axially extending central opening therethrough with a conically tapered or shaped inner surface 31. In this embodiment, surface 31 tapers conically from a larger opening at the right side (in FIG. 2 or 3) to a smaller opening in the left side. Also, surface 31 is fabricated with gear-like teeth or ridges (illustrated specifically at 32) in this embodiment to form a positive acting reclining brake mechanism. However, as will be explained in more detail below, surface 31 can be fabricated relatively smooth (as illustrated specifically at 33) to form a clutch type of mechanism. Element 30 is fixedly attached to outer element 24a and inner element 24b of seatback 22 by means of bolts (not shown) extending through holes 35 in outer element 24a, element 30, and inner element 24b.

Reclining mechanism 28 further includes a conically shaped element 37, which in this brake embodiment is fabricated with complementary ridges or gear teeth 38 in the outer periphery thereof. Element 37 is fabricated to be positioned within element 30 so that gear teeth 32 of element 30 mate or mesh with gear teeth 38 of element 37 to positively prevent relative rotary movement between elements 30 and 37. Element 37 is constructed with four holes 39 extending axially therethrough. Four slider pins 40 are provided for mounting element 30 between out board member 16a and in board member 16b. It will be understood that more or less slider pins can be employed.

Figure 4:
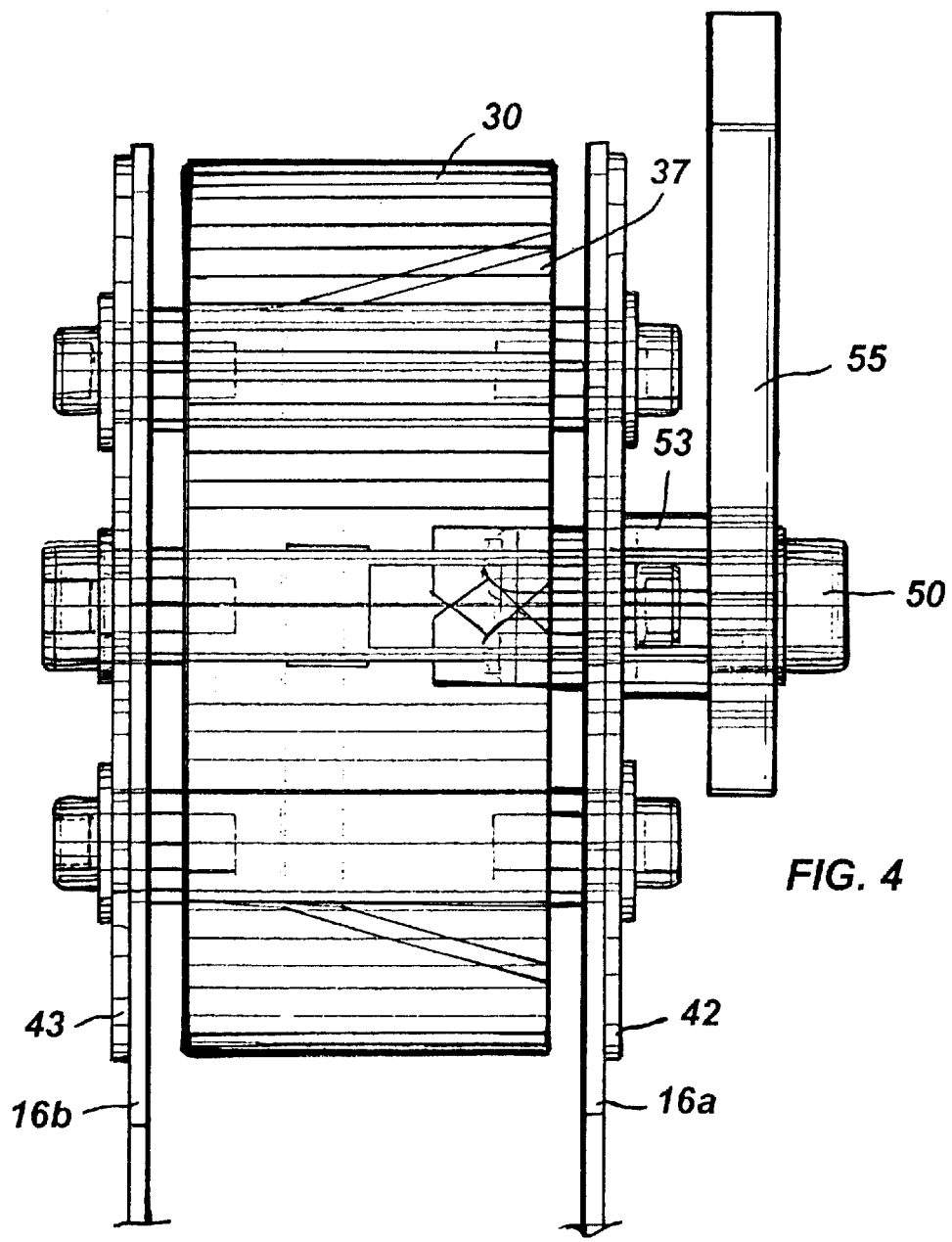
FIGS. 4 and 5 are sectional views of the portion of the seat frame and recliner mechanism illustrated in FIG. 2, in the unlocked and locked orientations, respectively.
Figure 5:
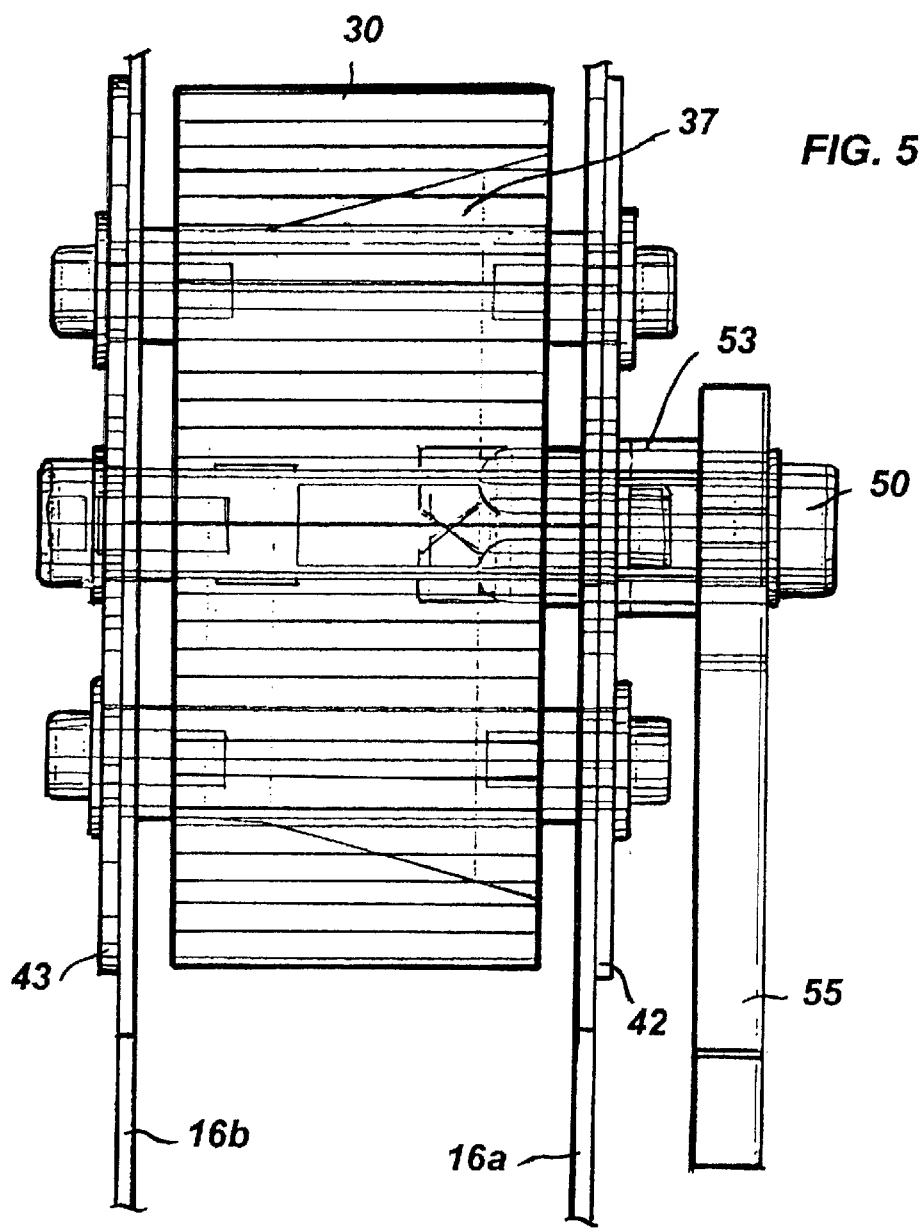

A pair of mounting plates 42 and 43 (see FIGS. 4 and 5) are provided and positioned at the outer surfaces of out board member 16a and in board member 16b, respectively. Mounting plates 42 and 43 each have four slotted holes 45 formed therein with an enlarged portion adjacent one end for receiving slider pins 40 and a smaller portion adjacent the other end. In the assembled orientation, slider pins 40 extend through holes 39 in element 37 and element 37 is positioned coaxially in the opening in element 30. One end of each of slider pins 40 extends through the enlarged portion of slotted holes 45 in mounting plate 42. Also, the other end of each of slider pins 40 extends through the enlarged portion of slotted holes 45 in mounting plate 43. The one or both ends of slider pins 40 are threaded and nuts are engaged to hold the assembly fixedly in place. Mounting plates 42 and 43 may be fixedly attached to members 16a and 16b by some means, such as welding or the like, or they may simply be held in place by slider pins 40 extending through holes in members 16a and 16b.

Here it should be noted that element 37 is shorter, axially, than element 30 and is free to slide axially along slider pins 40 a limited distance. Further, when element 37 is moved axially inwardly the full extent (locked orientation) it is positioned so that gears 33 in element 30 mesh with gears 38 on element 37, and when element 37 is moved axially outwardly the full extent (unlocked or reclining orientation) it is positioned so that gears 33 in element 30 do not mesh with gears 38 on element 37.

An axle 50 is constructed to extend through an axial hole 51 in element 37 and through axial holes 52 in mounting plates 42 and 43. Axle 50 is longer than slider pins 40 so as to extend outwardly from mounting plate 42 a short distance. A bearing sleeve 53 is positioned coaxially over the outwardly extending end of axle 50 (see FIGS. 4 and 5) and a recliner handle 55 is engaged on axle 50 by means of a nut threadedly engaged on the end of axle 50. Bearing sleeve 53 allows for relative movement between recliner handle 55 and mounting plate 42.

Recliner handle 55 has a pair of inwardly extending pins 56 attached thereto so as to extend through slotted openings 57 in mounting plate 42 and into openings 58 in the end of element 37. Openings 58 have sloping or cam shaped inner surfaces. Also, the inner ends of pins 56 are rounded to form cam engaging surfaces that are positioned to engage the cam shaped inner surfaces of openings 58. The cam surfaces of openings 58 are formed so that as recliner handle 55 is lifted or rotated upwardly (see FIG. 4), element 37 is cammed axially outwardly out of engagement with element 30 and seat back 22 is free to rotate between an upright and a reclining position. Once seat back 22 is positioned in the desired position, recliner handle 55 is lowered or rotated downwardly (see FIG. 5) and element 37 is cammed inwardly into engagement with element 30, which locks seatback 22 positively in the selected position.

In some embodiments it may be desirable to provide a compression spring 62 on axle 50 so as to provide a bias on element 37 tending to force element 37 into the unlocked position. In this embodiment, handle 55 may only cam element 37 into the locked position and, when released, spring 62 biases element 37 into the unlocked position. Here it will be understood that many different types of camming or axial movement systems may be developed to move elements 30 and 37 between locked and unlocked positions and the illustrated systems are simply for exemplary purposes.

Figure 6:
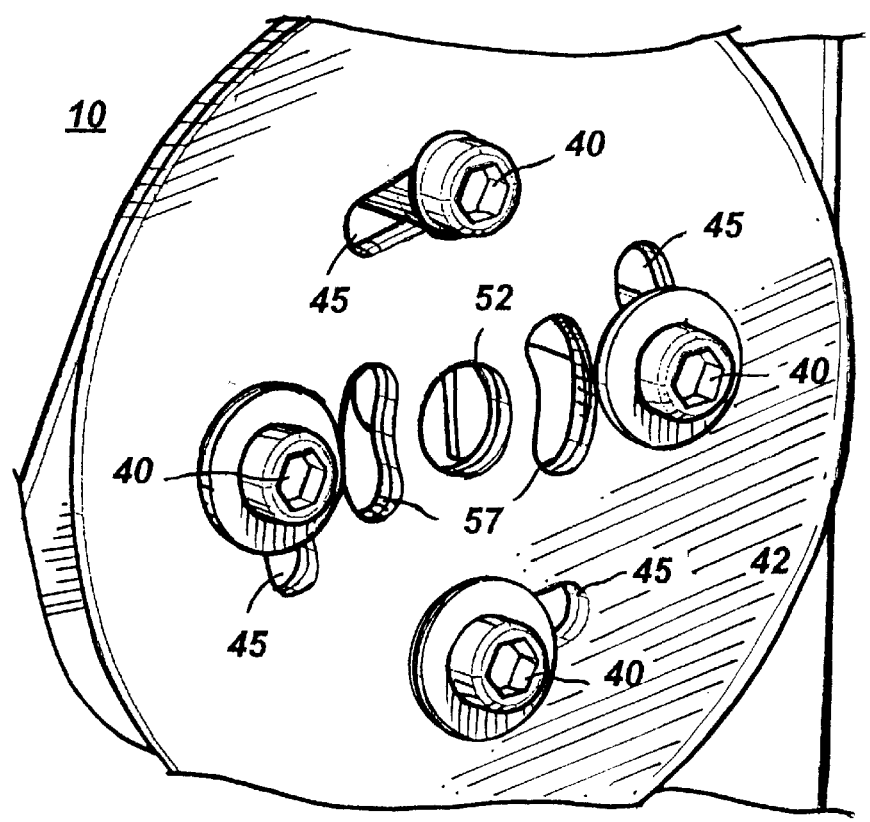
FIG. 6 is a greatly enlarged perspective view of a portion of the recliner mechanism mounting apparatus.

Referring additionally to FIG. 6, a greatly enlarged view of mounting plate 42 and the various openings described above is illustrated. From this view, the orientation of the various openings and the operation thereof can be more fully appreciated.

Figure 7:
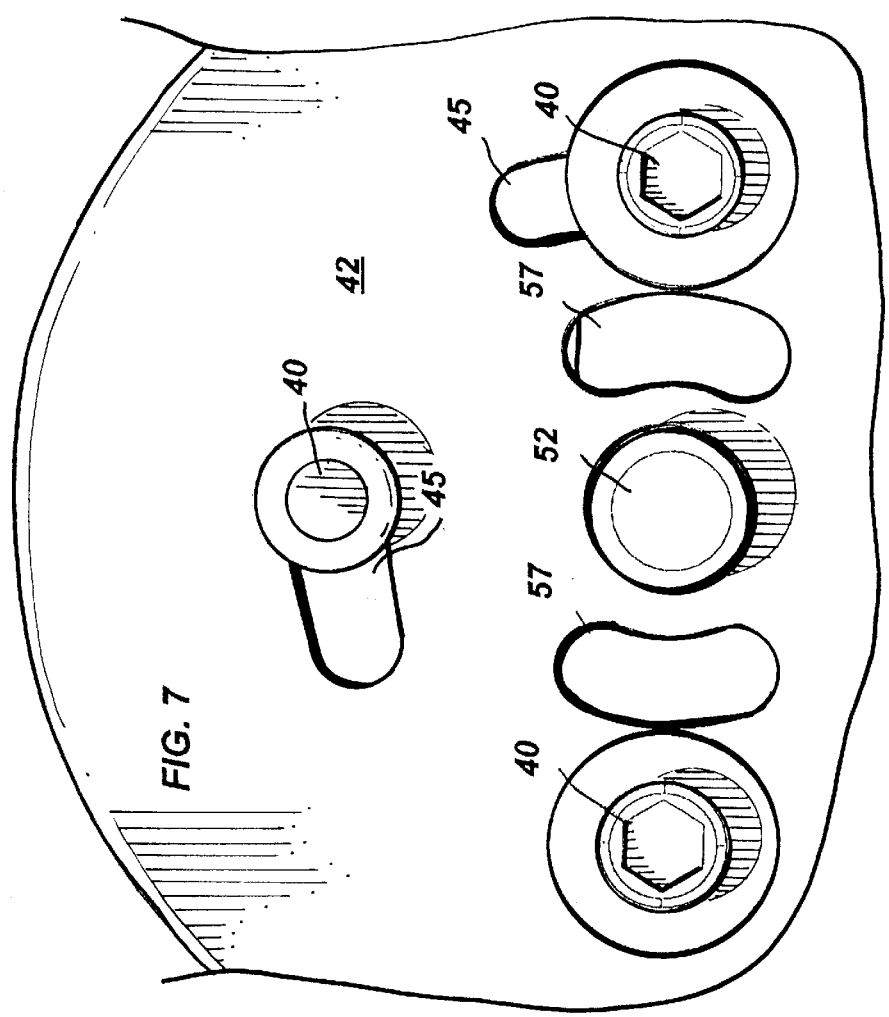
FIG. 7 is a side view of the recliner mechanism mounting apparatus illustrated in FIG. 6, showing an energy absorption feature.

Turning now to FIG. 7, an even greater enlarged view of mounting plate 42 is illustrated. In particular, this view shows one of the slotted holes 45 and an associated slider pin 40 in greater detail. As explained briefly above, at least one of the slotted holes 45 is formed so that the width at one end is approximately equal to the diameter of an associated slider pin 40. However, the width of slotted hole 45 tapers very gradually towards the opposite end so as to be somewhat smaller than the diameter of the associated slider pin 40. Thus, associated slider pin 40 can be easily engaged through the enlarged end of the slotted hole 45 for the assembly of recliner mechanism 10.

Under normal operating conditions or usage, the associated slider pin 40 is firmly attached to mounting plates 42 and 43 through the enlarged end of slotted hole 45. During a forward crash, a large force is applied to the associated slider pin 40 forcing it into the smaller portion of the slot, as illustrated in dotted lines in FIG. 7. As slider pin 40 moves into the smaller portion of slotted hole 45, metal is stretched/compressed/deformed, which translates into substantial energy absorption. Here it will be understood that all four slotted openings 45 can be constructed in this fashion or only the openings extending in the direction of a potential crash.

In a somewhat different embodiment, the inner surface 31 of element 30 is formed so as to be relatively smooth (see surface 33 in FIG. 3). Similarly, the outer surface of element 37 is relatively smooth. In this embodiment, reclining mechanism 10 operates like a clutch, rather than a positive brake. As element 37 is cammed or otherwise moved axially inwardly into engagement with element 30, a frictional engagement between the engaging inner and outer surfaces slows and ultimately prevents relative rotary movement. The "relatively smooth" inner surface of element 30 and the "relatively smooth" outer surface of element 37 could be for example, smooth metal or other hard material, rough metal or other hard material, rubber or other pliable soft material, etc. The amount of clutching movement or braking desired can be provided by the amount of relative axial movement provided between elements 30 and 37.

Figure 8:
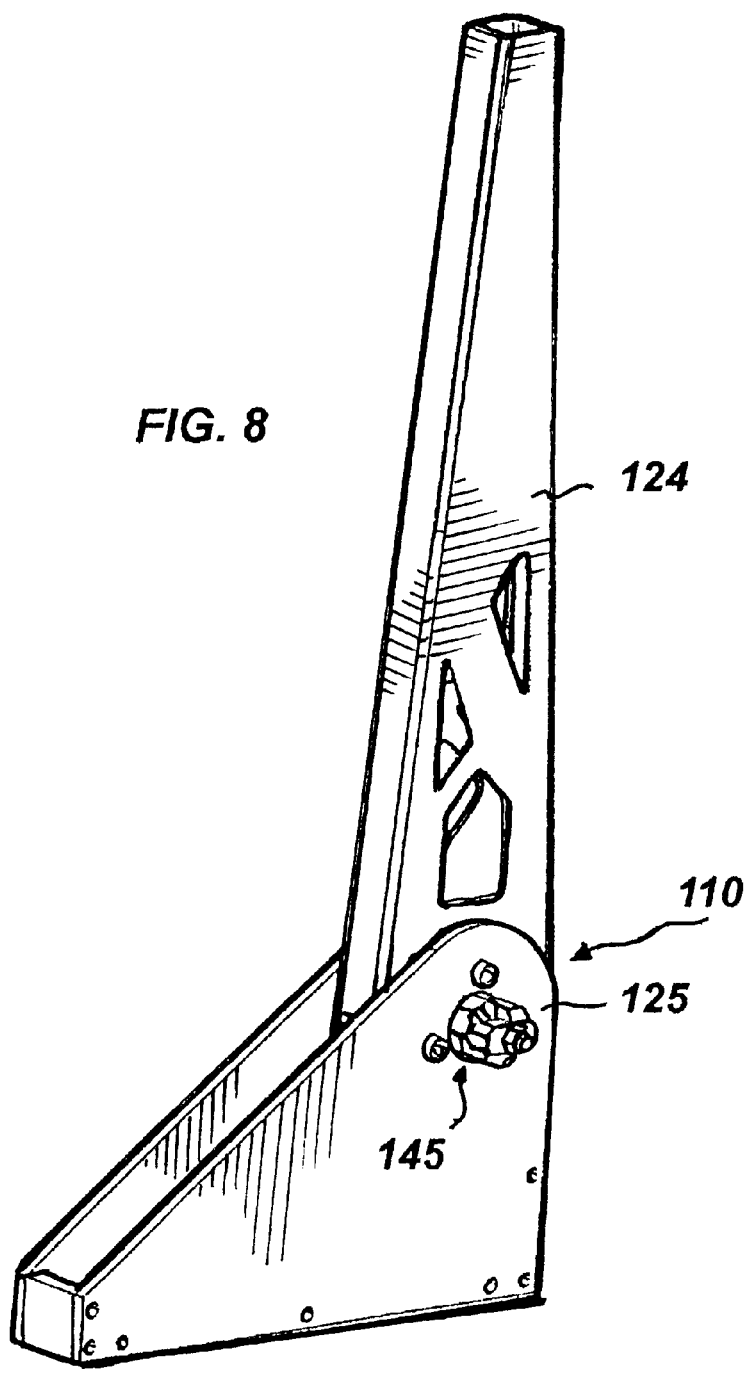
FIG. 8 is a perspective view of one side of a seat frame and recliner mechanism incorporating another embodiment of the present invention.

Turning now to FIG. 8, another embodiment of a recliner mechanism 110 is illustrated. An out board member 124 of a back portion is pivotally coupled to end 125 on the out board side of a seat portion by means of reclining mechanism 110. The back portion and the seat portion are not illustrated in greater detail, as they can be similar to those described in the previous embodiment. Reclining mechanism 110 allows for adjustment in the positioning of the back frame, as will be described in more detail presently. As stated in the previous embodiment, it will be understood by those skilled in the art that while, reclining mechanism 110 is coupled to the out board side of the seat frame, this is simply convention, and reclining mechanism may be reversed as desired.

Figure 9:
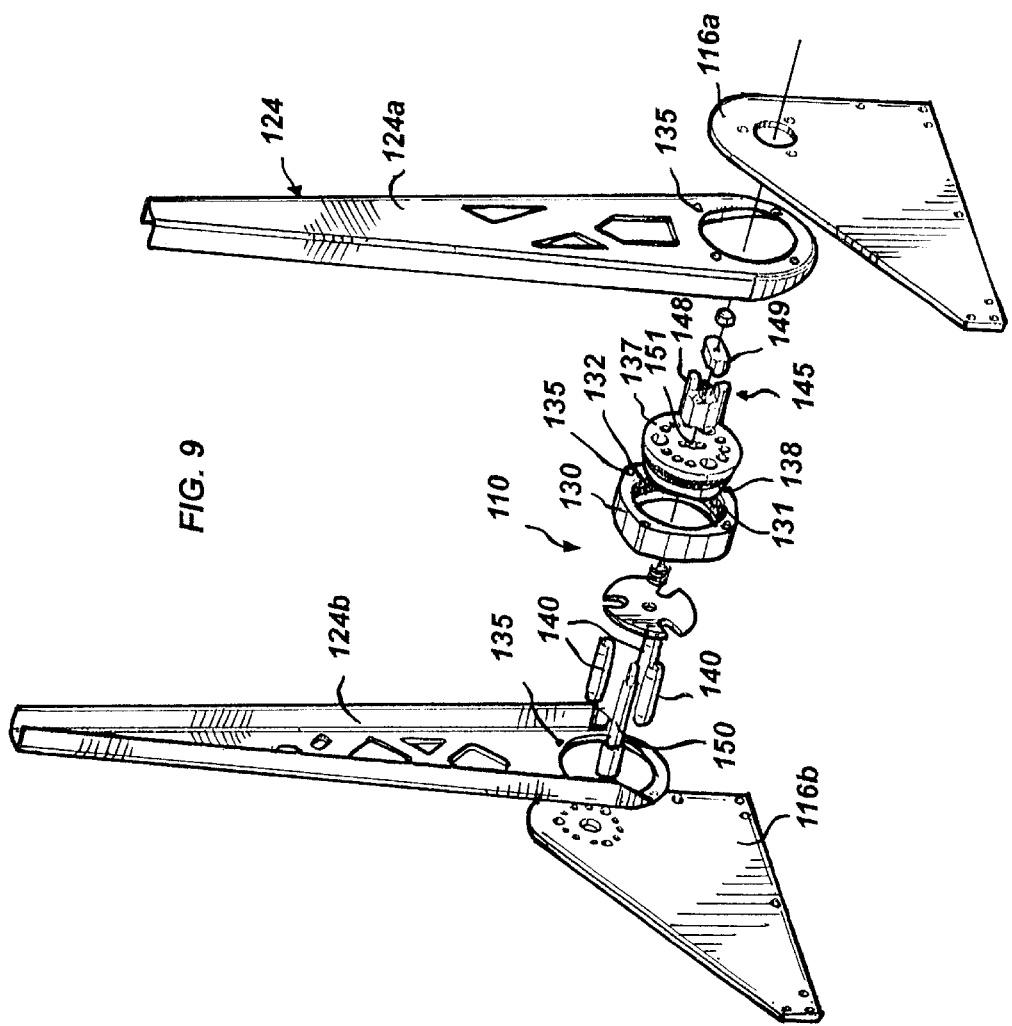
FIG. 9 is an exploded perspective view of a portion of the seat frame and recliner mechanism of FIG. 8.

Turning now to FIG. 9, the out board member 124 and reclining mechanism 110 are shown in an exploded view to better illustrate the various components and their relationships. As can be seen best in FIG. 9, the outboard element of the seat portion includes an out board member 116a and an in board member 116b, illustrated in an exploded or separated position. Also, outboard member 124 of the seatback includes an outer element 124a and a mating inner element 124b, illustrated in an exploded or separated position.

Figure 10:
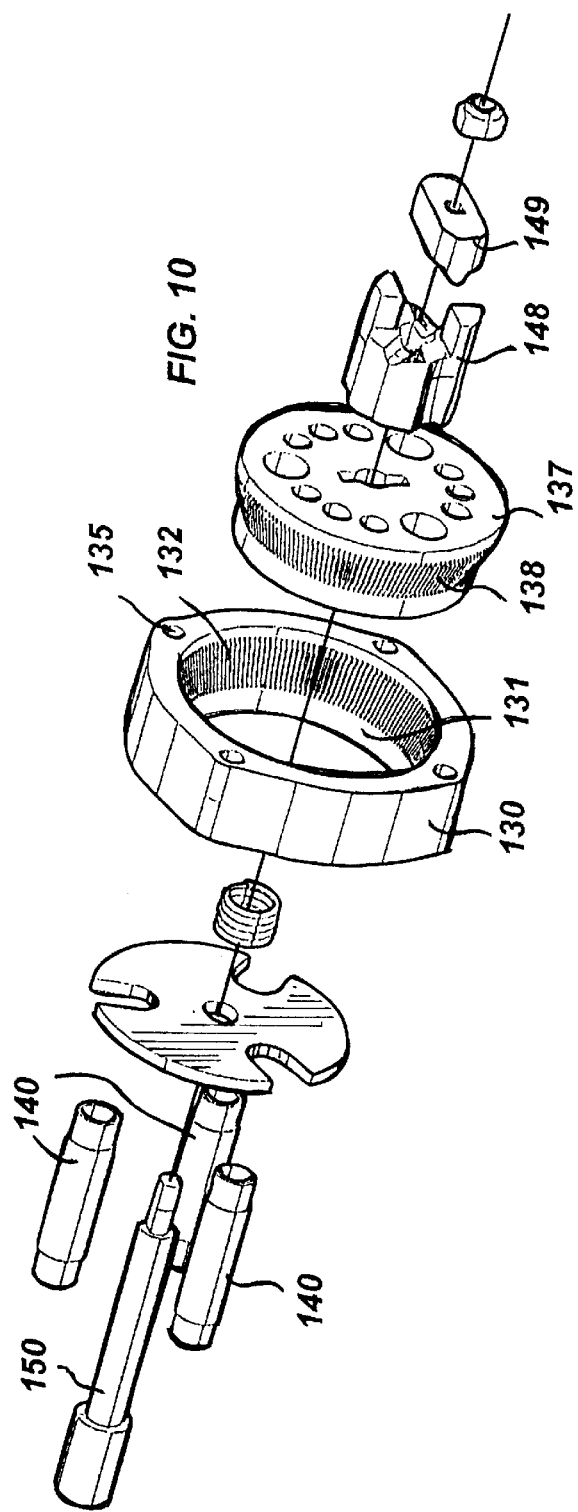
FIG. 10 is an enlarged perspective view, similar to FIG. 9, illustrating the various components of the recliner mechanism in more detail.

Referring additionally to FIG. 10, it can be seen that reclining mechanism 110 includes a cylindrically shaped element 130 having an axially extending central opening therethrough with a conically tapered or shaped inner surface 131. In this embodiment, surface 131 tapers conically from a larger opening at the right side (in FIG. 9 or 10) to a smaller opening in the left side. Also, surface 131 is fabricated with gear-like teeth or ridges 132 in this embodiment to form a positive acting reclining brake mechanism. However, as will be explained in more detail below, surface 131 can be fabricated relatively smoothly to form a clutch type of mechanism. Element 130 is fixedly attached to outer element 124a and inner element 124b of the seatback by means of bolts (not shown) extending through holes 135 in outer element 124a, element 130, and inner element 124b.

Reclining mechanism 110 further includes a conically shaped element 137, which in this embodiment is fabricated with complementary ridges or gear teeth 138 in the outer periphery thereof. Element 137 is fabricated to be positioned within element 130 so that gear teeth 132 of element 130 mate or mesh with gear teeth 138 of element 137 to positively prevent relative rotary movement between elements 130 and 137. Three slider pins 140 are provided for slidably mounting element 137 between out board member 116a and in board member 116b.

Here it should be noted that element 137 is free to slide axially along slider pins 140 a limited distance. Further, when element 137 is moved axially inwardly the full extent (locked orientation) it is positioned so that gears 133 in element 130 mesh with gears 138 on element 137, and when element 137 is moved axially outwardly the full extent (unlocked or reclining orientation) it is positioned so that gears 133 in element 130 do not mesh with gears 138 on element 137.

An axial movement system is coupled to conical element 137 for moving it between the locked orientation and the unlocked orientation. In this embodiment, the axial movement system includes a cam assembly 145 carried by an axle 150 concurrently extending through the central opening of cylindrical element 130 and an axial hole 151 formed in conical element 137. Shaft or Axle 150 is rotatably attached to in board member 116b and passes through an opening in out board member 116a as can be seen with momentary reference back to FIG. 8.

Figure 11:
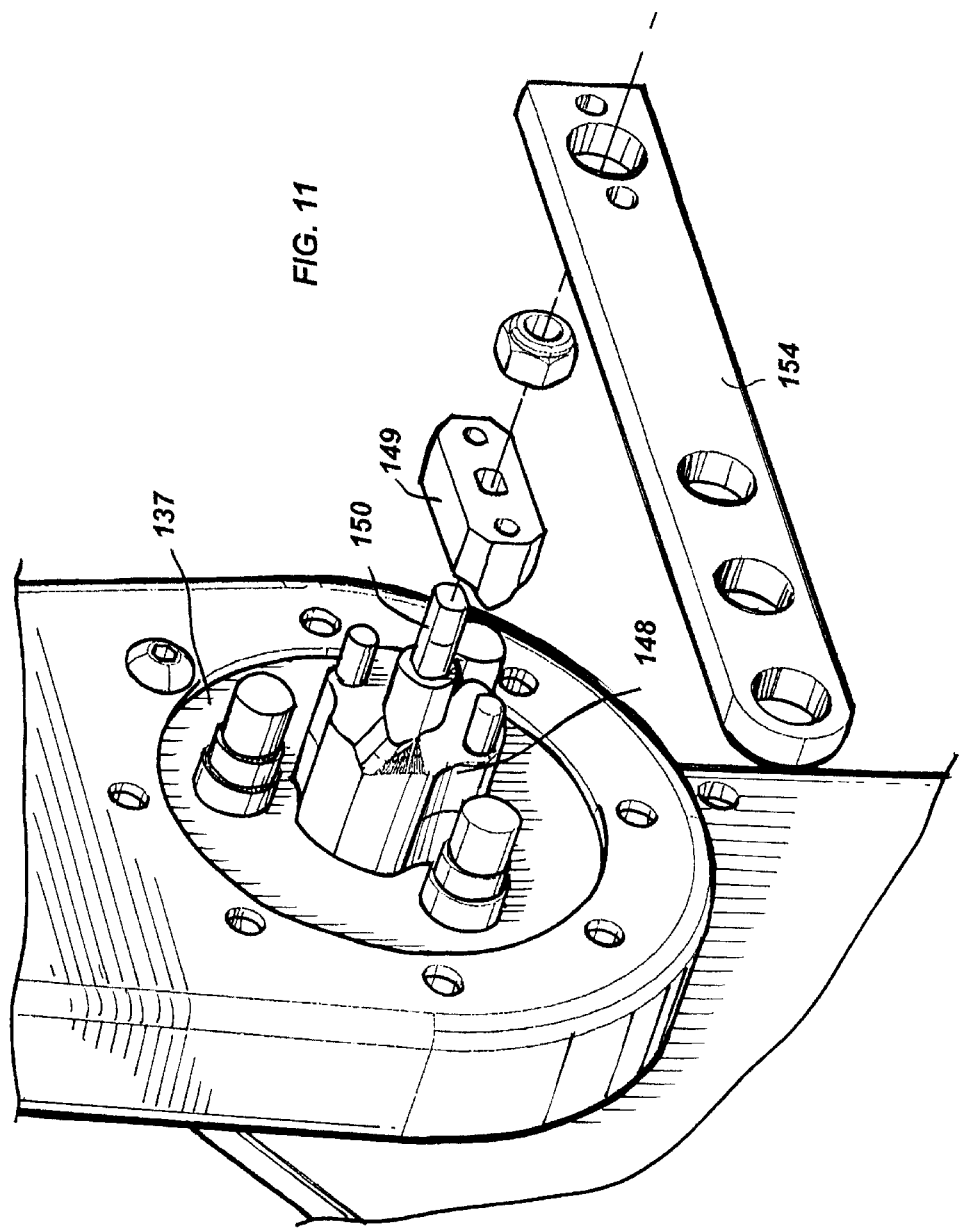
FIG. 11 is an enlarged perspective view illustrating the camming system of the recliner mechanism of FIG. 8.

Referring to FIGS. 10 and 11, cam assembly 145 includes a cam surface 148 slidably carried by axle 150 adjacent conical element 137 and a cam 149 rotatably carried by axle 150 and movable along cam surface 148. As cam 149 is rotated by handle 154, cam surface 148 is forced axially inwardly against conical element 137 moving element 137 into the locked orientation. When the rotation of cam 149 is reversed, element 137 is permitted to return to the unlocked orientation. A disengagement spring 158 is positioned between a back plate 159 and element 137 for biasing element 137 axially outwardly into the unlocked orientation.

Figure 12:
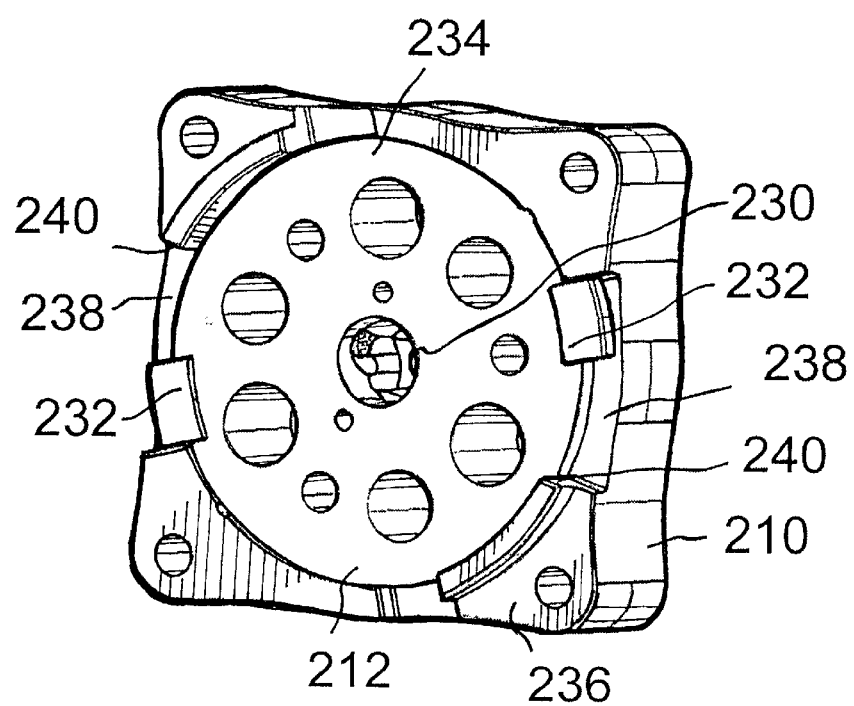
FIG. 12 is an enlarged perspective view of another embodiment of an assembled cylindrically shaped element and mating conically shaped element, in a fully engaged orientation, for use in a seat frame and recliner mechanism similar to that of FIG. 8.
Figure 13:
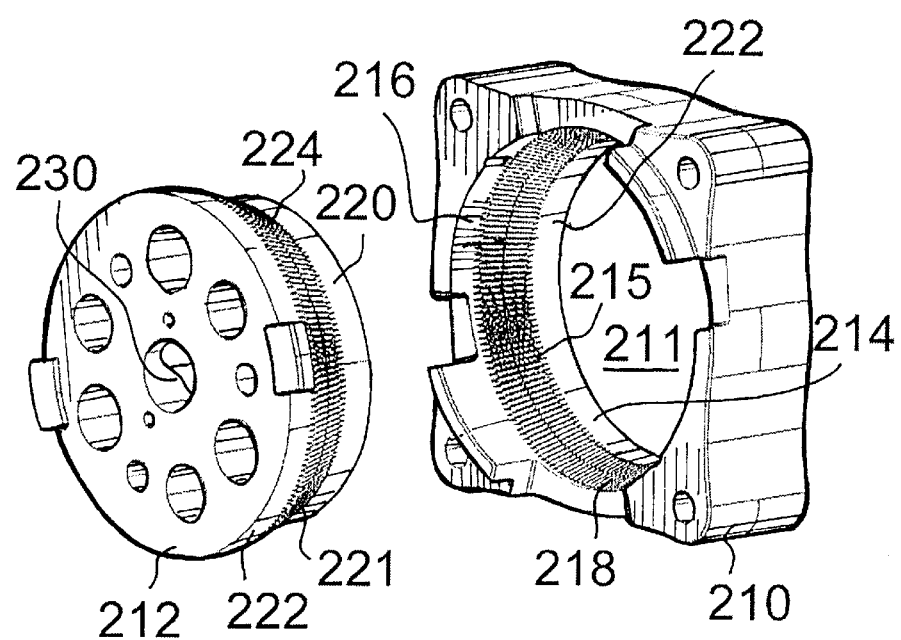
FIG. 13 is an enlarged perspective view of the cylindrically shaped element and mating conically shaped element of FIG. 12, disassembled to show the internal construction.
Figure 15:
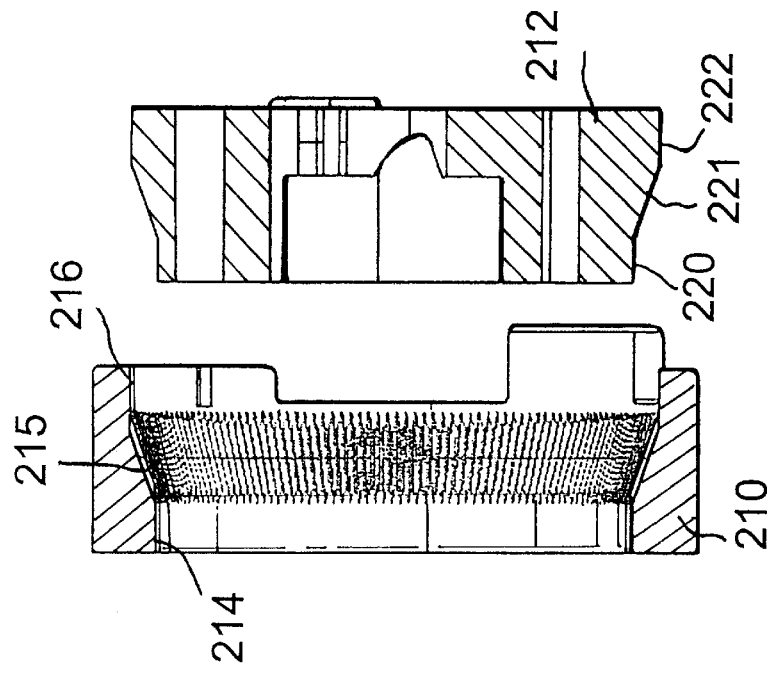
FIG. 15 is an enlarged side view of the cylindrically shaped element and mating conically shaped element of FIG. 12 disassembled to show the internal construction, portions thereof broken away.
Figure 14:
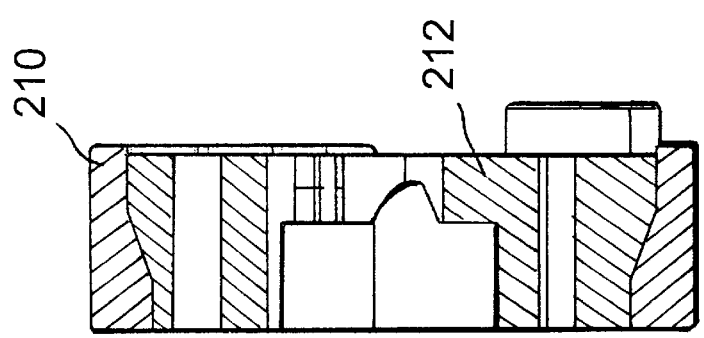
FIG. 14 is an enlarged side view, portions thereof broken away, of the assembled cylindrically shaped element and mating conically shaped element of FIG. 12.

Turning now to FIG. 12, an enlarged perspective view is illustrated of another embodiment of an assembled cylindrically shaped element 210 and mating conically shaped element 212 for use in a seat frame and recliner mechanism similar to that of FIG. 8. Cylindrically shaped element 210 has an axially extending central opening 211 therethrough with an inner surface that is divided into three circumferentially extending areas 214, 215, and 216. Area 214 is generally straight sided (i.e., area 214 forms a substantially right circular cylinder) so as to form a portion of a first journal contact area. Area 215 has a conically tapered or shaped inner surface that tapers conically from a larger opening at the left side (in FIG. 12 or 13) to a smaller opening at the right side. Also, area 215 is fabricated with gear-like teeth or ridges 218 (see FIG. 13) to form a positive acting reclining brake mechanism, similar to that explained above with respect to FIGS. 9 and 10. Area 216 is a generally straight sided (i.e., area 216 forms a substantially right circular cylinder) so as to form a portion of a second journal contact area. Further, area 214 has a smaller diameter than area 216 and area 215 tapers from area 216 to area 214 to form a conical section. Cylindrically shaped element 210 is fixedly attached to the seatback by means of bolts, as explained above.

In this embodiment the reclining mechanism further includes conically shaped element 212, the outer surface of which is divided into three circumferentially extending areas 220, 221, and 222. Area 220 is generally straight sided (i.e., area 220 forms a substantially right circular cylinder) so as to complete the first journal contact area, in conjunction with area 214 of element 210. Area 221 has a conically tapered or shaped inner surface that tapers conically from a larger opening at the left side (in FIG. 12 or 13) to a smaller opening at the right side. Also, area 221 is fabricated with gear-like teeth or ridges 224 in the outer periphery thereof (see FIG. 13). Area 222 is a generally straight sided (i.e., area 222 forms a substantially right circular cylinder) so as to complete the second journal contact area in conjunction with area 216 of element 210. Further, area 220 has a smaller diameter than area 222 and area 221 tapers from area 222 to area 221 to form a conical section. Element 212 is fabricated to be positioned within element 210 so that gear teeth 224 of element 212 mate or mesh with gear teeth 218 of element 210 to positively prevent relative rotary movement between elements 210 and 212 in the engaged position to form a positive acting reclining brake mechanism, similar to that explained above with respect to FIGS. 9 and 10. Slider pins are provided for slidably mounting element 212 between the outboard member and the inboard member, as described above.

Also, as explained in detail above, an axial movement system is coupled to conical element 212 for moving it between the locked orientation and the unlocked orientation. In this embodiment, the axial movement system includes a cam assembly carried by an axle concurrently extending through the central opening of cylindrical element 210 and an axial hole 230 formed in conical element 212. The shaft or axle is fixedly attached to the inboard member and passes through an opening in the outboard member as can be seen with momentary reference back to FIG. 8.

Figure 16:
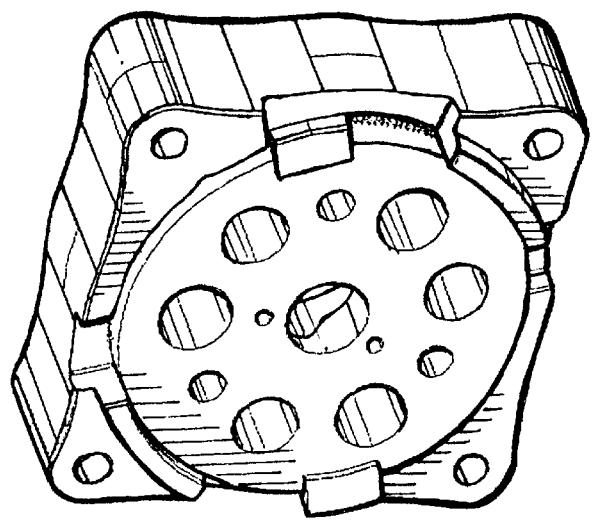
FIG. 16 is a perspective view of the assembled cylindrically shaped element and mating conically shaped element of FIG. 12, in a fully disengaged orientation and upright position.
Figure 18:
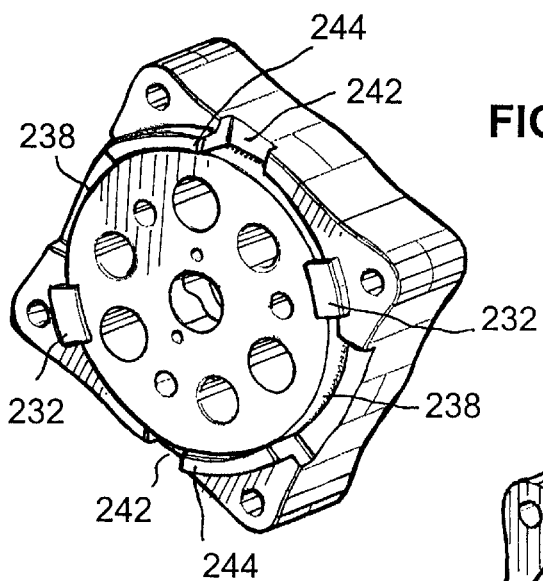
FIG. 18 is a perspective view of the assembled cylindrically shaped element and mating conically shaped element of FIG. 12, in a dwell orientation.

Here it should be noted that element 212 is free to slide axially along the slider pins a limited distance. In general, this limited distance can be slightly greater than the radial depth of the gear teeth 218 and 224. Further, when element 212 is moved axially inwardly the full extent (locked or fully engaged orientation, as illustrated in FIG. 12) it is positioned so that gear teeth 218 in element 210 mesh with gear teeth 224 on element 212, and when element 212 is moved axially outwardly the full extent (unlocked or fully disengaged orientation, as illustrated in FIG. 16) it is positioned so that gear teeth 218 in element 210 do not mesh (are disengaged) with gear teeth 224 on element 212.

Elements 210 and 212 are formed so that the outer diameter of area 220 of element 210 is slightly smaller than the inner diameter of area 214 of element 210. Also, the outer diameter of area 222 of element 210 is slightly smaller than the inner diameter of area 216 of element 210. Further, the axial length of the first and second journal contact areas (i.e., areas 214/220 and 216/222) is sufficiently long so that as element 212 moves between the fully engaged orientation and the fully disengaged orientation the first and second journal contact areas telescope apart but remain engaged (i.e., coaxial or nested). In other words, the axial distance element 212 moves relative to element 210 in the engage/disengage operation is smaller than the axial length of the first and second journal contact areas (i.e., areas 214/220 and 216/222). Thus, the first and second journal contact areas maintain substantially exact axial alignment between element 210 and element 212 during any relative axial movements. It should be noted that in some applications slider pins and the like may not be required, since the first and second journal contact areas maintain substantially exact axial alignment.

Figure 17:
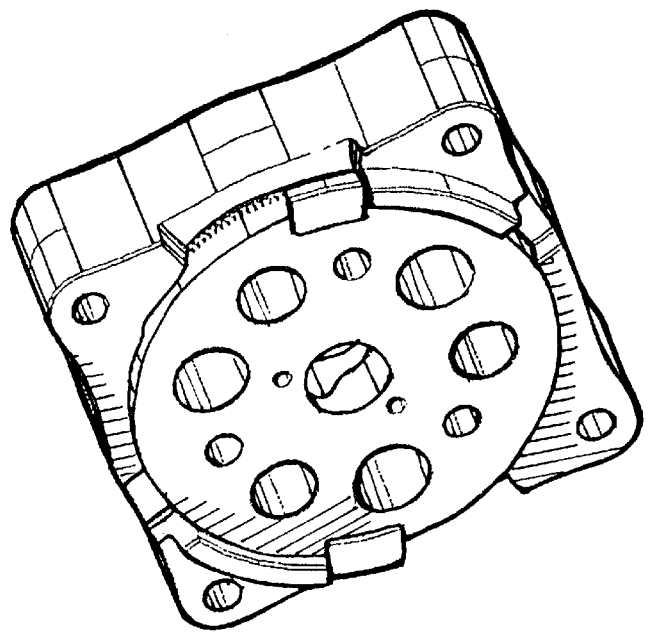
FIG. 17 is a perspective view of the assembled cylindrically shaped element and mating conically shaped element of FIG. 12, in a fully reclined position.

In this embodiment, element 212 has a pair of position tabs 232 affixed to the surface of the end with the larger diameter, designated 234. Tabs 232 are oriented in diametrically opposed positions and extend radially outwardly from surface 234 of element 212. Element 210 has circumferentially extending notches in the surface with the larger diameter opening, designated 236, so as to mate with tabs 232. A pair of diametrically opposed notches 238 are formed in surface 236 of element 210 so as to extend a substantial distance (e.g. 30 degrees to 45 degrees) circumferentially. Notches 238 define the recline operation zone and represent a fully reclined position of the attached seat back in the extreme clockwise position (FIG. 17) and the straight-up position in the extreme counterclockwise position (FIG. 16). Here it should be noted that, in this embodiment, the seat back actually moves element 210 relative to element 212, but the relative clockwise and counterclockwise positions are used for simplicity and better understanding in this disclosure.

To move the seat back anywhere between the straight-up and fully reclined positions the operator simply moves the handle to disengage element 212 from element 210 (see FIG. 16), moves the seat back to the desired orientation and then releases the handle so that element 212 is spring biased into engagement with element 210 (see FIG. 12). The extreme clockwise position includes a tab stop 240 in each notch 238 that extends outwardly from surface 236 and operates as a stop to prevent further clockwise rotation of element 212 relative to element 210 (see FIG. 17). The axial height of stop 240 is greater than the axial movement of element 212 so that tabs 232 cannot move beyond tab stops 240. Thus, the seat back cannot be inadvertently moved beyond a fixed inclined position, dictated by stops 240.

Figure 19:
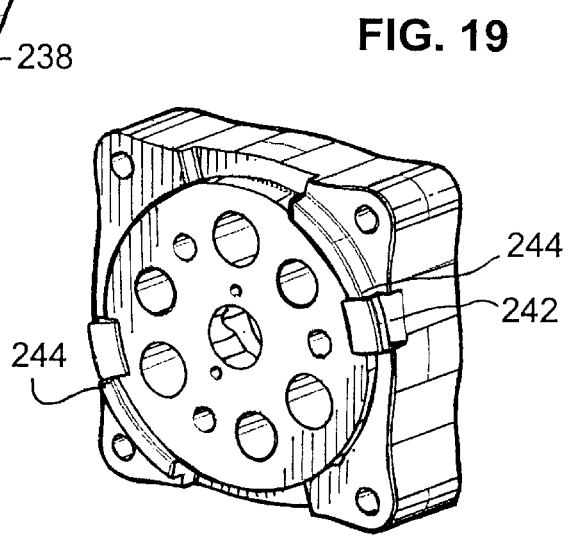
FIG. 19 is a perspective view of the assembled cylindrically shaped element and mating conically shaped element of FIG. 12, in a flat folded position (the attached seat)

The tabs 232 can be moved out of notches 238 in the counterclockwise direction and into a dwell zone in which tabs 232 rest on a portion of the surface 236 of element 210. The seat back can be moved throughout the dwell zone without holding the handle in the disengaged position. Ultimately, the seat back is moved into a folded position in which it is flat on the seat. To achieve this position tabs 232 are moved through the dwell zone and finally drop into notches 242 (see FIG. 19), which are a pair of diametrically opposed notches that extend circumferentially a distance slightly greater than the width of tabs 232. A tab stop 244 is formed at the extreme counterclockwise end of each notch 242 and serves to prevent tabs 232 from being inadvertently moved beyond notches 242. The flat seat back position is a special application in this embodiment and is understood to be optional. Other optional seat back positions can be provide, using the above teaching and the amount of recline provided for the seat back can be easily changed or modified for other applications.

Figure 20:
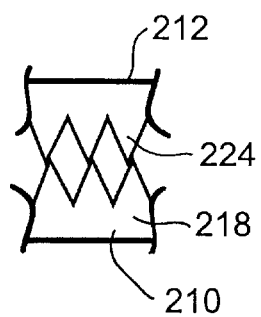
FIGS. 20 and 21 are partial views of the assembled cylindrically shaped element and mating conically shaped element of FIG. 12 in false latch orientations.
Figure 21:
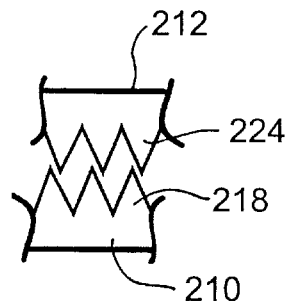

In this embodiment, element 210 is formed as one integral unit and may be, for example, fabricated by molding, machining, etc. Fabricating element 210 as an integral unit with all the notches and stops substantially improves the operation and greatly simplifies fabrication and assembly. If the notches and stops are assembled on the element after the various components are fabricated, the manufacturing tolerances and positioning during assembly can produce minor misalignment of gear teeth 218 in element 210 with gear teeth 221 on element 212. This misalignment is referred to as a false latch and can actually produce a failure of the seat locking mechanism. Typical false latches are illustrated in FIGS. 20 and 21. As can be seen from these figures, a slight misalignment between elements 210 and 212 can result in gear teeth 224 of element 212 resting on one or the other slopes of gear teeth 218 of element 210.

This misalignment is not too serious when the seat is positioned at any midpoint in the recline operation zone because the seat back can simply slip slightly rearward (FIG. 20) or forward (FIG. 21) until gear teeth 218 and 224 mesh fully. However, when the seat back is moved to the full upright position with tabs 232 butting against stops 240, if gear teeth 218 and 224 are misaligned as illustrated in FIG. 20, the seat back cannot move (because of stops 240) and the teeth remain misaligned or in the false lock position. This is a very serious situation because, as explained in more detail above, the meshing of gear teeth 218 and 224 is the mechanism that prevents movement of the seat back during the application of high forces (e.g., crashes and the like). If only the tips of gear teeth 218 and 224 are engaged (as illustrated in FIG. 20), they can relatively easily be sheared off during high impact situations to allow the seat back to move.

By fabricating element 210, along with the stops and notches, as an integral unit gear teeth 218 can easily be correctly positioned relative to the stops or ends of the notches so that false latching does not occur. Besides holding the manufacturing tolerances within limits that prevent false locking, in a preferred embodiment element 210 is formed from powdered metal, which produces finer surfaces and further reduces the tolerances and the possibility of gear teeth misalignment. Here it should be understood that other embodiments, such as multiple parts, may be used in some applications.

Thus, a new and improved cone recliner/clutch mechanism is disclosed with components designed to remain aligned during positioning of the elements so that jamming of the gear teeth due to misalignment is prevented. The present mechanism always moves smoothly and positively between selected positions. Further, because of the novel construction and manufacturing, false latching and the dangers inherent therein are eliminated. Also, while gear teeth 218 and 224 are illustrated as extending completely around the circumference of elements 210 and 212, respectively, it will be understood that in some applications the gear teeth could extend only partially around, if desired. However, since the meshing of gear teeth 218 and 224 is the mechanism that prevents movement of the seat back, the gear teeth extending completely around provide more resistance to impact forces and are, therefore, preferred.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A recliner mechanism for a seat frame including a back portion and a seat portion, the recliner mechanism comprising:

a cylindrical element having an axially extending central opening formed therein defining an inner surface, a first portion of the inner surface being conically tapered with circumferentially extending gear teeth thereon, the cylindrical element attachable to one of the back portion and the seat portion;

a conically shaped element attachable to the other of the back portion and the seat portion, the conically shaped element having an outer surface receivable within the central opening and circumferentially extending mating gear teeth on a first portion of the outer surface, the conically shaped element movable in an axially inward direction to a locked orientation with the gear teeth of the cylindrical element engaging the mating gear teeth of the conically shaped element for inhibiting relative movement of the back portion and the seat portion, and movable in an axially outward direction to an unlocked orientation with the gear teeth of the cylindrical element disengaged from the mating gear teeth of the conically shaped element for permitting relative movement of the back portion and the seat portion; and a radially outwardly extending position tab on a surface of one of the cylindrical element and the conically shaped element and a mating notch formed in a surface of the other of the cylindrical element and the conically shaped element for limiting and defining reclining movements.

2. A recliner mechanism as claimed in claim 1 wherein the mating notch includes a circumferentially extending notch with first and second ends positioned to receive the position tab therein and define a recline operation zone in which movement of the position tab from one end of the notch to an opposite end coincides with movement of the back portion of the seat frame from an upright position to a recline position.

3. A recliner mechanism as claimed in claim 2 further including an additional mating notch, spaced circumferentially from the circumferentially extending notch, and positioned to receive the position tab therein and define an additional position of the back portion of the seat frame.

4. A recliner mechanism as claimed in claim 3 further including a dwell zone defined between the circumferentially extending notch and the additional mating notch, the dwell zone including a portion of surface on which the position tab rests to hold the mechanism in an unlocked orientation with the gear teeth of the cylindrical element disengaged from the mating gear teeth of the conically shaped element.

5. A recliner mechanism as claimed in claim 1 further including tab stops formed adjacent at least one side of the mating notch to prevent the position tab from moving out of the mating notch.

6. A recliner mechanism as claimed in claim 5 wherein the mating notch and the tab stops are formed in the cylindrical element and the mating notch, the tab stops, the gear teeth on the inner surface, and the cylindrical element are formed as an integral unit.

7. A recliner mechanism as claimed in claim 6 wherein the cylindrical element includes powdered metal.

8. A recliner mechanism for a seat frame including a back portion and a seat portion, the recliner mechanism comprising:
  a cylindrical element having an axially extending central opening formed therein defining an inner surface, a first portion of the inner surface being conically tapered with circumferentially extending gear teeth thereon, the cylindrical element attachable to one of the back portion and the seat portion;
  a conically shaped element attachable to the other of the back portion and the seat portion, the conically shaped element having an outer surface receivable within the central opening and circumferentially extending mating gear teeth on a first portion of the outer surface, the conically shaped element movable in an axially inward direction to a locked orientation with the gear teeth of the cylindrical element engaging the mating gear teeth of the conically shaped element for inhibiting relative movement of the back portion and the seat portion, and movable in an axially outward direction to an unlocked orientation with the gear teeth of the cylindrical element disengaged from the mating gear teeth of the conically shaped element for permitting relative movement of the back portion and the seat portion; and
  a second portion of the inner surface of the axially extending central opening of the cylindrical element and a second portion of the outer surface of the conically shaped element cooperate to form mating first journal contact areas for cooperating to maintain the cylindrical element and the conically shaped element axially aligned during movements of the back portion of the seat frame, and a third portion of the inner surface of the axially extending central opening of the cylindrical element and a third portion of the outer surface of the conically shaped element cooperate to form second mating journal contact areas positioned on an opposite edge of the first portions of the inner and outer surfaces.

9. A recliner mechanism as claimed in claim 8 wherein the second portion of the inner surface of the axially extending central opening of the cylindrical element and the second portion of the outer surface of the conically shaped element are designed to define coaxial right cylinders.

10. A recliner mechanism as claimed in claim 8 wherein the second portion of the inner surface of the axially extending central opening of the cylindrical element and the second portion of the outer surface of the conically shaped element are designed with an axial length greater than an amount of axial movement of the conically shaped element between the locked orientation and the unlocked orientation.

11. A recliner mechanism as claimed in claim 8 wherein the third portion of the inner surface of the axially extending central opening of the cylindrical element and the third portion of the outer surface of the conically shaped element are designed to define coaxial right cylinders.

12. A recliner mechanism as claimed in claim 11 wherein the third portion of the inner surface of the axially extending central opening of the cylindrical element and the third portion of the outer surface of the conically shaped element are designed with an axial length greater than an amount of axial movement of the conically shaped element between the locked orientation and the unlocked orientation.

13. A recliner mechanism for a seat frame including a back portion and a seat portion, the recliner mechanism comprising:
  a cylindrical element having an axially extending central opening formed therein defining an inner surface, a first portion of the inner surface being conically tapered with circumferentially extending gear teeth thereon and a second portion being designed to form a first journal contact area, the cylindrical element attachable to one of the back portion and the seat portion;
  a conically shaped element attachable to the other of the back portion and the seat portion, the conically shaped element having an outer surface receivable within the central opening with circumferentially extending mating gear teeth on a first portion of the outer surface and a second portion of the outer surface being designed to form a first mating journal contact area, the conically shaped element movable in an axially inward direction to a locked orientation with the gear teeth of the cylindrical element engaging the mating gear teeth of the conically shaped element for inhibiting relative movement of the back portion and the seat portion, and movable in an axially outward direction to an unlocked orientation with the gear teeth of the cylindrical element disengaged from the mating gear teeth of the conically shaped element for permitting relative movement of the back portion and the seat portion, the second portion of the inner surface and the second portion of the outer surface cooperating to form a first mating journal for maintaining axial alignment between the conically shaped element and the cylindrical element during relative axial movement therebetween; and
  a radially outwardly extending position tab on a surface of one of the cylindrical element and the conically shaped element and a mating notch formed in a surface of the other of the cylindrical element and the conically shaped element for limiting and defining reclining movements.

14. A recliner mechanism as claimed in claim 13 wherein the mating notch includes a circumferentially extending notch with first and second ends positioned to receive the position tab therein and define a recline operation zone in which movement of the position tab from one end of the notch to an opposite end coincides with movement of the back portion of the seat frame from an upright position to a recline position.

15. A recliner mechanism as claimed in claim 14 further including an additional mating notch, spaced circumferentially from the circumferentially extending notch, and positioned to receive the position tab therein and define an additional position of the back portion of the seat frame.

16. A recliner mechanism as claimed in claim 15 further including a dwell zone defined between the circumferentially extending notch and the additional mating notch, the dwell zone including a portion of surface on which the position tab rests to hold the mechanism in an unlocked orientation with the gear teeth of the cylindrical element disengaged from the mating gear teeth of the conically shaped element.

17. A recliner mechanism as claimed in claim 13 further including tab stops formed adjacent at least one side of the mating notch to prevent the position tab from moving out of the mating notch.

18. A recliner mechanism as claimed in claim 17 wherein the mating notch and the tab stops are formed in the cylindrical element and the mating notch, the tab stops, the gear teeth on the inner surface, and the cylindrical element are formed as an integral unit.

19. A recliner mechanism as claimed in claim 18 wherein the mating notch, the tab stops, the gear teeth on the inner surface, and the cylindrical element are positioned to substantially prevent false latching.

20. A recliner mechanism as claimed in claim 18 wherein the cylindrical element includes powdered metal.

21. A recliner mechanism for a seat frame including a back portion and a seat portion, the recliner mechanism comprising:

a cylindrical element having an axially extending central opening formed therein defining an inner surface, a first portion of the inner surface being conically tapered with circumferentially extending gear teeth thereon and a second portion being designed to form a first journal contact area, the cylindrical element attachable to one of the back portion and the seat portion;

a conically shaped element attachable to the other of the back portion and the seat portion, the conically shaped element having an outer surface receivable within the central opening with circumferentially extending mating gear teeth on a first portion of the outer surface and a second portion of the outer surface being designed to form a first mating journal contact area, the conically shaped element movable in an axially inward direction to a locked orientation with the gear teeth of the cylindrical element engaging the mating gear teeth of the conically shaped element for inhibiting relative movement of the back portion and the seat portion, and movable in an axially outward direction to an unlocked orientation with the gear teeth of the cylindrical element disengaged from the mating gear teeth of the conically shaped element for permitting relative movement of the back portion and the seat portion, the second portion of the inner surface and the second portion of the outer surface cooperating to form a first mating journal for maintaining axial alignment between the conically shaped element and the cylindrical element during relative axial movement therebetween; and the first mating journal contact areas are positioned adjacent one edge of the first portions of the inner and outer surfaces and the mechanism further includes a third portion of the inner surface of the axially extending central opening of the cylindrical element and a third portion of the outer surface of the conically shaped element cooperating to form second mating journal contact areas positioned on an opposite edge of the first portions of the inner and outer surfaces.

22. A recliner mechanism for a seat frame including a back portion and a seat portion, the recliner mechanism comprising:

a cylindrical element having an axially extending central opening formed therein defining an inner surface, a first portion of the inner surface being conically tapered with circumferentially extending gear teeth thereon and a second portion being designed to form a first journal contact area, a mating notch formed in a surface of the cylindrical element for limiting and defining reclining movements, the cylindrical element, the gear teeth on the inner surface, the first journal contact area, and the mating notch being formed as an integral unit and positioned to substantially prevent false latching, the cylindrical element attachable to one of the back portion and the seat portion; and a conically shaped element attachable to the other of the back portion and the seat portion, the conically shaped element having an outer surface receivable within the central opening with circumferentially extending mating gear teeth on a first portion of the outer surface and a second portion of the outer surface being designed to form a first mating journal contact area, and a radially outwardly extending position tab on a surface of the cylindrical element positioned to be received within the mating notch of the cylindrical element, the conically shaped element movable in an axially inward direction to a locked orientation with the gear teeth of the cylindrical element engaging the mating gear teeth of the conically shaped element for inhibiting relative movement of the back portion and the seat portion, and movable in an axially outward direction to an unlocked orientation with the gear teeth of the cylindrical element disengaged from the mating gear teeth of the conically shaped element for permitting relative movement of the back portion and the seat portion, the second portion of the inner surface cooperating with the second portion of the outer surface to form a first mating journal for maintaining axial alignment between the conically shaped element and the cylindrical element during relative axial movement therebetween.

* * * * *